Oct. 23, 1945.　　　　　C. S. ASH　　　　　2,387,382
DUAL WHEEL ASSEMBLY
Filed March 9, 1942　　　2 Sheets-Sheet 2

INVENTOR
Charles S. Ash
BY
ATTORNEY

Patented Oct. 23, 1945

2,387,382

UNITED STATES PATENT OFFICE 2,387,382

DUAL WHEEL ASSEMBLY

Charles S. Ash, Milford, Mich.

Application March 9, 1942, Serial No. 433,866

4 Claims. (Cl. 301—36)

The present invention relates to new and useful improvements in dual wheel assemblies and particularly independently rotatable dual wheels for automotive road vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate two embodiments of the invention, and together with the description, serve to explain the principles of the invention.

The present invention has for its object the provision of a novel and improved dual wheel construction in which the parts are simplified and may be produced economically. A further object is the provision of a dual wheel construction having hub members adapted to receive, and permit easy replacement of, standard types of automotive or trailer wheels. The invention further provides a dual wheel structure in which the outer wheel and its hub may be removed from their supporting member to provide free and easy access to the inner wheel and hub, the inner wheel being independently rotatable with respect to the supporting member.

Figure 1:
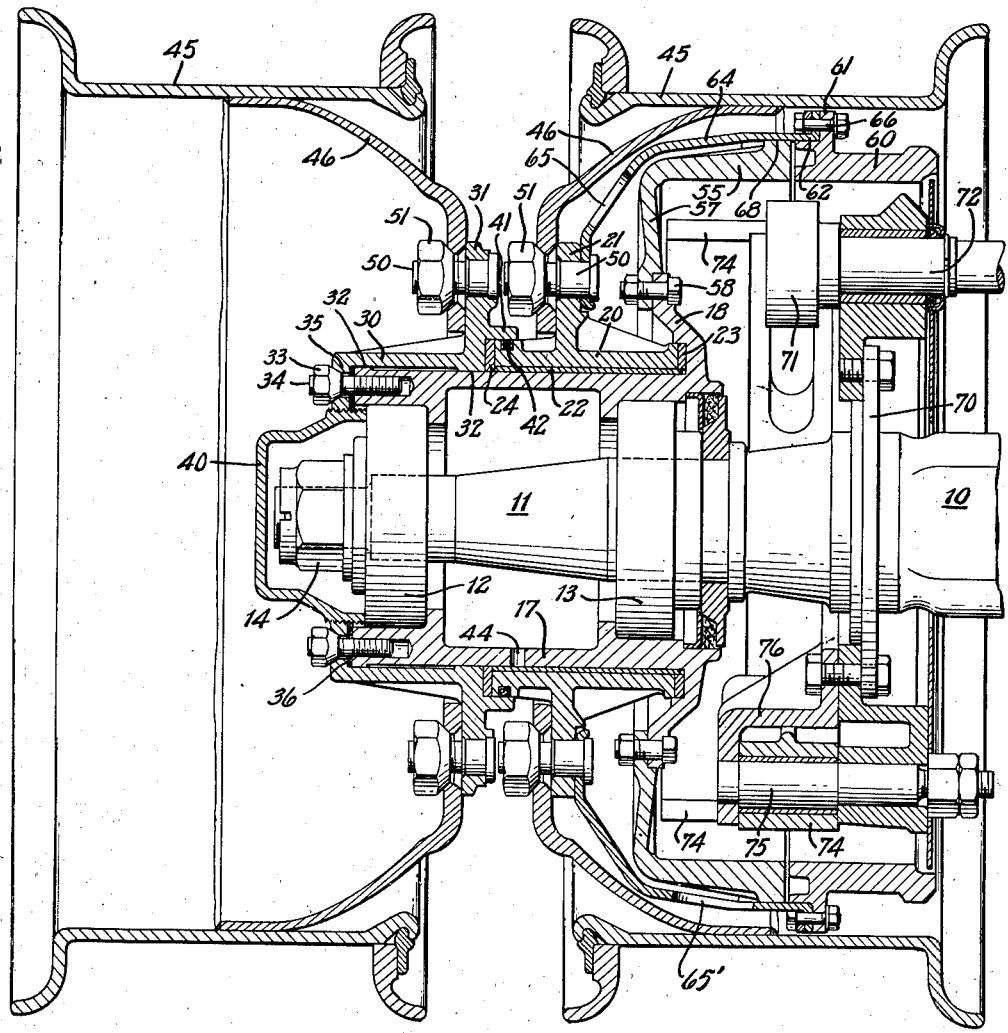
Figure 1 is a vertical sectional view showing a typical and illustrative embodiment of the present invention as applied to trailing, or non-driven, dual wheels.

Referring now in detail to the typical embodiment of the invention illustrated in Figure 1 of the drawings, the invention is shown as applied to a set of independently rotatable dual wheels to be rotatably supported at the end of a trailing, or dead, axle 10 of conventional construction which is provided with a tapered end 11 on which are received in spaced relation the anti-friction bearings 12 and 13, preferably of the tapered roller type and held in place by the usual shoulders and retaining nut 14.

The axle end 11 forms a support for the freely rotatable sleeve member 17 which is provided with bearing seats to receive the outer races of the bearings 12 and 13. The outer surface of the sleeve member 17 is cylindrical and of uniform diameter except for brake attaching member 18. The outer surface of sleeve 17 provides a journal on which the hub portion of the inner wheel is freely rotatable. This inner wheel hub portion comprises an elongated cylindrical sleeve 20 to which is integrally formed the radially extending flange 21, centrally thereof. Sleeve 20 is lined with a bushing 22, preferably of graphite bronze, extending for its full length so that easy relative rotation is assured between the sleeves 17 and 20.

The brake mounting member 18 extends substantially radially from the inner end of the sleeve 17 and is recessed to receive a thrust washer 23 between it and the inner end of the inner wheel hub sleeve 20. A similar thrust washer 24 is provided at the outer end of the inner wheel hub 20.

The outer wheel is provided with a relatively long hub which is axially slidable over the sleeve 17 and may be slid thereover or removed therefrom. This outer wheel hub comprises a tubular member 30 to which is integrally formed a radially extending flange 31 and has finished inner surfaces 32 at each end by which it is closely fitted to the outer surface of sleeve 17. The hub 30 extends outwardly and is flanged centrally to abut the outer end of sleeve 17 and is apertured to receive the conically tapered nuts 33 which are threaded onto the axially extending studs 34, threadedly secured in the outer end of the sleeve 17. The nuts 33 cooperate with similarly tapered seats in the outer face of flange 35 so that the inner surface 32 and the nuts 33 cooperate to accurately seat the outer wheel hub coaxially with respect to the axle end 11 and the inner wheel hub sleeve 17. The thrust washer 24 provides a bearing between the sleeves 20 and 30 at their adjacent ends and shims 36 are provided between the end of sleeve 17 and flange 35 to attain proper spacial relationships.

To seal the bearings against dust, and to secure the bearing 12 in its seat, a hub cap 40 is threaded into the outer flange 35 and its inner face abuts the outer race of the bearing 12, also covering the nut 14.

The outer hub sleeve 30 is provided at its inner end with an axial extension 41 which cooperates with the packing ring 42 to form an intermediate dust seal and lubricant retainer so that any lubricant draining through the aperture 44 in sleeve 17 is not readily expelled.

The flanges 21 and 31 are illustratively shown as adapted to receive and be secure to a standard form of Budd wheel and near their peripheries the flanges are provided with a series of wheel mounting studs, illustratively shown according to my prior application Serial Number 418,118 filed November 7, 1941, by which the pneumatic tire mounting rims 45 and attached wheel webs 46 are mounted.

Each of the wheels 46 is provided with a circular opening having a series of holes uniformly spaced near its inner periphery to receive the studs 50 and be secured by the conical nuts 51, thereby securely holding the demountable wheel 46 to its respective mounting flange 21 or 31.

Means are also provided for preventing substantial axial movement of the inner wheel hub 20 with reference to the mounting sleeve 17 independent of the outer wheel hub 30, and these means are preferably associated with the braking means for the independently rotatable wheels. As embodied the radially extending flange 18 at the inner end of the sleeve 17 is finished to provide a circular seat on which the outer wheel brake drum 55 may be mounted by means of its web portion 57 which extends radially inwardly and is shouldered to fit over the outer periphery of the flange 18 and be secured thereto by means of the attaching bolts 58 which rigidly fasten the brake drum 55 to sleeve 17 thereby providing a braking member rigidly attached to the outer hub 30 and its associated wheel and rim 45, 46.

The inner wheel brake comprises a substantially cylindrical brake drum 60 preferably of the same internal diameter as brake drum 55 and coaxial thereto. At its inner end drum 60 is provided with a narrow flange 61 which fits into the turned edge 62 of the deeply dished connecting drum 64, and is secured thereto by a plurality of bolts 66. The deeply dished mounting drum 64 extends outwardly and radially inwardly, and is provided with a centrally apertured portion having a series of bolt holes therein by which it is securely fastened to the flange 21 by means of the mounting bolts 50 for the inner wheel, thereby providing a rigid connection between the brake drum 60, the inner wheel hubs 21 and its associated rim and wheel 45, 46.

The mounting drum 64 is preferably substantially cylindrical near its innermost or turned edge 62, and the outer wheel brake drum 55 is provided with a cylindrical surface 68 of slightly larger diameter than the remainder of the outside of brake drum 55 and only very slightly smaller than the interior of the mounting drum end 62, thereby providing a support and radial bearing for the brake drum 55, thus more accurately to hold the drums 55 and 60 in coaxial relation. This construction also prevents accidental removal of the hub 20 from the sleeve 17 and requires that the entire wheel assembly be removed from the axle end before the inner wheel hub 20 can be slid from its sleeve 17.

The mounting drum 64 is also preferably provided with a plurality of apertures 65, 65' to permit the circulation of air about the outer wheel brake drum 55 for the dissipation of heat generated therein by braking action.

Suitable brake shoe means are provided to cooperate with the brake drums 55 and 60 and may be of substantially conventional construction. As embodied the brake anchor 70 is provided on which is supported the brake actuating cam 71 rotatably mounted by its shaft 72, while the brake shoes 74 are pivotally mounted for expansion by means of pivot pins 75 secured in the yoke 76 attached to the anchor plate 70. The brake shoes 74 are thus expanded in the conventional manner into contact with the inner surfaces of the cylindrical brake drums 55 and 60 independently retarding the rotation of these drums. Each brake shoe 74 engages both drums 55 and 60 and the bearing surfaces 62 and 68 hold the brake drums in true alinement so that the inner surface of each is the cylindrical extension of the other.

When it is desired to remove the inner wheel, as in the case of a puncture of the inner tire, the conical nuts 33 are removed thereby allowing the outer hub 30 to be slid from the sleeve 17. When the outer hub has been completely removed, the wheel mounting nuts 51 for the inner wheel may be removed, and the inner wheel may be changed and secured in place by replacement of the nuts 51. During this operation, which can be performed easily on the road, the inner wheel hub 20 is held against removal from the sleeve 17 by the inner wheel brake drum 60, thereby preventing the operator of the truck from tampering with the bearings or exposing them to dirt and the like. After the inner wheel has been replaced, the outer wheel and its hub 30 are replaced on the sleeve 17 with the bolts 34 projecting through apertures in the end of the hub 30, and the outer wheel hub is rigidly secured to the sleeve 17 against both axial and rotational movement by means of the conical nuts 33.

When it is desired to separate the inner wheel hub 20 from its sleeve 17, an operation which should be performed in the shop, the castellated nut 14 is removed thereby permitting the entire wheel assembly including its bearings 12 and 13 and its brake drums 55 and 60 to be removed from the axle end. The outer wheel and its hub 30 may then be removed in the usual manner, and the bolts 66 may be removed to free the inner wheel brake drum 60 from its mounting drum 64. Thereupon the inner wheel hub 20 may be slid axially from the sleeve 17 giving complete access to all of the bearings 22, 23, 24.

Figure 2:
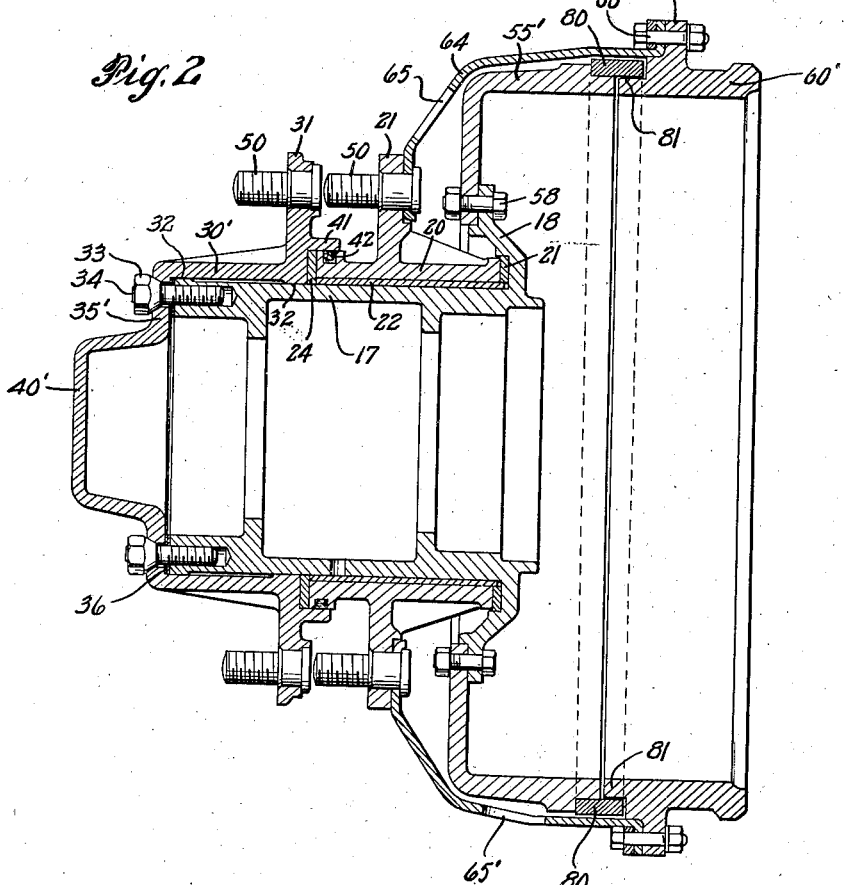
Figure 2 is a vertical sectional view, with the wheels omitted, of a modified embodiment of hub structure and braking means.

Figure 2 of the drawings shows a modified embodiment of the invention in which the outer hub 30' is formed with an integral hub cap 40', the flange-like portion 35' between the hub cap and hub being apertured to receive the axially extending studs 34 and the cooperating conical nuts 33 by which the outer hub is secured to the sleeve 17 to prevent relative axial and rotational movement. In other respects, the hubs, wheel mounting, sleeve and bearings of this embodiment may be duplicates of those shown in Figure 1, and are so shown.

Figure 2 also shows a modification of the braking means and in this form the outer wheel brake drum 55' is shouldered to provide a seat for a supporting or centering ring 80 which projects into a correspondingly shouldered portion 81 of the brake drum 60'. The ring 80 may be pressed or shrunk upon the outer wheel brake drum 55' with the projecting portion forming a running fit with the shouldered portion 81 of drum 60', thus serving to align and support each brake drum with the other upon application of the common brake shoe.

Figure 3:
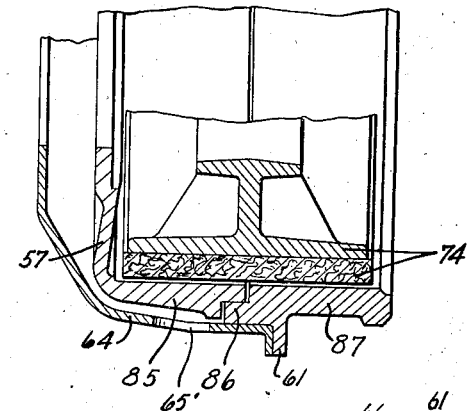
Figure 3 is a fragmentary detail section of modified brake drums which may be associated with the mechanism of Figure 1.

Or, if desired, the ring 80 may be so constructed as to be loose from each drum but journaled upon the respective drum shoulders so as to serve as a centering or so-called compensating ring. Thus if one drum heats and expands faster than the other drum it will grip the ring 80 and be held against further expansion until the slower expanding drum meets the ring 80 and is thereby aligned with the first mentioned drum, further expansion thereafter being uniform due to the ring 89. In the form of brake drums just described the ring 80 may be made of high-tensile steel and thus contribute to the lesser strength of the brake drums which may be made of metal with inferior strength. Figure 3 shows another modification of the braking means. In the form the outer wheel brake drum 85 is shouldered to telescope slightly with the adjacent shouldered portion 86 of the inner wheel brake drum 87, thereby providing strong bearing surfaces between the brake drums, the bearing surfaces being formed as part of the brake drums themselves.

The assembly and dis-assembly of the embodiment shown in Figure 2, both for the replacement of the inner wheel as well as for removal of the inner wheel hub from the sleeve 17, may be identical with the similar operations for the embodiment of Figures 1 and 3.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly, the combination of a tubular sleeve rotably mounted on an axle end and having a generally cylindrical exterior and a flange at one end thereof, an elongated hub having a cylindrical bushing, fitted to the sleeve and rotatable thereon, a second elongated hub axially slidable on the sleeve and fitted thereto between which and the flange the first hub is mounted, said second hub having an inwardly extending flange overlying the outer end of the sleeve, means cooperating with the second hub flange and sleeve for detachably securing the second hub against axial and rotational movement on the sleeve, and means carried by the hubs for mounting a wheel on each hub.

2. In a dual wheel assembly, the combination of a tubular sleeve rotably mounted on an axle end and having a generally cylindrical exterior and a flange at one end thereof, an elongated hub having a cylindrical bushing, fitted to the sleeve and rotatable thereon, a second elongated hub axially slidable on the sleeve and fitted thereto between which and the flange the first hub is mounted, thrust bearings between the second hub, the first hub and said flange, said second hub having an inwardly extending flange overlying the outer end of the sleeve, means cooperating with the second hub flange and sleeve for detachably securing the second hub against axial and rotational movement on the sleeve, and means carried by the hubs for mounting a wheel on each hub.

3. In a dual wheel assembly, the combination of a tubular sleeve rotably mounted on an axle end and having a generally cylindrical exterior and a flange at one end thereof, an elongated hub having a cylindrical bushing, fitted to the sleeve and rotatable thereon, a second elongated hub axially slidable on the sleeve and fitted thereto between which and the flange the first hub is mounted, said second hub having an inwardly extending flange overlying the outer end of the sleeve, means cooperating with the second hub flange and sleeve for detachably securing the second hub against axial and rotational movement on the sleeve, means carried by the hubs for mounting a wheel on each hub and means preventing axial movement of the first hub on the sleeve when the second hub has been removed.

4. In a dual wheel assembly, the combination of a cylindrical rotatable sleeve having a flange extending radially at an end thereof, an elongated hub having a wheel mounting flange thereon and rotatably journaled on the sleeve, a second hub having a wheel mounting flange fitted to the sleeve and axially slidable over an end thereof, said second hub having an inwardly extending flange overlying the outer end of the sleeve, means cooperating with the second hub flange and sleeve for detachably securing the second hub against axial and rotational movement on the sleeve, and means at the inner side of the first elongated hub preventing removal of the first hub from the sleeve in the absence of the second hub.

CHARLES S. ASH.